(12) United States Patent
Shengyi

(10) Patent No.: US 8,354,021 B2
(45) Date of Patent: Jan. 15, 2013

(54) SYSTEM OF WATER COLLECTING, CLEANING, AND STORING

(75) Inventor: Qin Shengyi, Beijing (CN)

(73) Assignee: Beijing Rechsand Science & Technology Group Co., Ltd, Beijing (CN)

(*) Notice: Subject to any disclaimer, the term of this patent is extended or adjusted under 35 U.S.C. 154(b) by 416 days.

(21) Appl. No.: 12/530,564

(22) PCT Filed: Mar. 7, 2008

(86) PCT No.: PCT/CN2008/070447
§ 371 (c)(1),
(2), (4) Date: Nov. 30, 2009

(87) PCT Pub. No.: WO2008/110103
PCT Pub. Date: Sep. 18, 2008

(65) Prior Publication Data
US 2010/0108586 A1  May 6, 2010

(30) Foreign Application Priority Data
Mar. 9, 2007 (CN) .......................... 2007 1 0064303

(51) Int. Cl.
*B01D 24/12* (2006.01)
(52) U.S. Cl. ................. 210/164; 210/170.03; 210/172.2; 210/266; 210/291; 210/315; 210/317; 210/416.1; 210/490; 210/502.1; 210/506
(58) Field of Classification Search .................. 210/164, 210/170.01, 172.2, 172.6, 256, 266, 288, 210/289, 291, 315, 317, 416.1, 440, 496, 210/502.1, 510.1, 170.03, 490
See application file for complete search history.

(56) References Cited

U.S. PATENT DOCUMENTS

| | | | | |
|---|---|---|---|---|
| 23,297 A * | 3/1859 | Fitch | | 210/263 |
| 548,823 A * | 10/1895 | Walker | | 210/214 |
| 1,535,112 A * | 4/1925 | Duke et al. | | 210/541 |
| 1,775,982 A * | 9/1930 | Waters et al. | | 210/288 |
| 2,043,734 A * | 6/1936 | Camp | | 210/277 |
| 2,302,240 A * | 11/1942 | Michaud | | 210/288 |
| 3,538,020 A * | 11/1970 | Heskett et al. | | 210/496 |
| 4,340,478 A * | 7/1982 | Stannard et al. | | 210/286 |
| 5,022,986 A * | 6/1991 | Lang | | 210/94 |

(Continued)

FOREIGN PATENT DOCUMENTS
CN   1324423   11/2001
(Continued)

OTHER PUBLICATIONS

Australian Office Action related to AU application No. 2008226227, dated Sep. 8, 2010 (2 pages).

*Primary Examiner* — Matthew Savage
(74) *Attorney, Agent, or Firm* — Bacon & Thomas, PLLC

(57) ABSTRACT

A system of water collecting, cleaning, and storing comprises a top-opened water storing container (1), with the wall of which a watertight structure; a collecting well (2) provided in the water storing container (1), which has a lid (6) and has a wall of permeable structure through which water exchange between the water storing container (1) and the collecting well (2) is achieved; filling elements (4) filled between the collecting well (2) and the water storing container (1), on top of which a pervious surface layer (5) is paved.

16 Claims, 3 Drawing Sheets

U.S. PATENT DOCUMENTS

| | | | |
|---|---|---|---|
| 5,505,892 A * | 4/1996 | Domme | 264/29.6 |
| 6,202,750 B1 | 3/2001 | Ohanesian | |
| 6,382,237 B1 | 5/2002 | Takai | |
| 6,684,813 B1 * | 2/2004 | Lemon | 119/69.5 |
| 2007/0215536 A1 * | 9/2007 | Bommi et al. | 210/282 |

FOREIGN PATENT DOCUMENTS

| | | |
|---|---|---|
| CN | 1448591 | 10/2003 |
| CN | 2595887 | 12/2003 |
| CN | 1597591 | 3/2005 |
| CN | 1994955 | 7/2007 |
| CN | 101046103 | 10/2007 |
| CN | 201031410 | 3/2008 |
| DE | 4307066 A1 * | 9/1994 |
| JP | 60-022154 B2 | 2/1985 |
| JP | 62-174402 A | 7/1987 |
| JP | 02-279842 A | 11/1990 |
| JP | 11-303153 A | 11/1999 |
| JP | 2000-186351 | 7/2000 |
| JP | 2000-186351 A | 7/2000 |
| JP | 2003-138611 | 5/2003 |

\* cited by examiner

SYSTEM OF WATER COLLECTING, CLEANING, AND STORING

TECHNICAL FIELD

The invention relates to a water collecting, filtering and cleaning, and storing device, in particular to a system of water collecting, cleaning and storing capable of keeping water quality.

BACKGROUND ART

At present, the water resources in the world are in scarcity and a lot of areas lack of water. In a lot of areas lacking of water, people lack of both drinking water and water for life and production. In order to solve the problem of water scarcity in these areas, wells are dug in a lot of areas; however, the groundwater in these areas is also in scarcity, so the water in the wells often comes from rainwater, river water and the like, which is not filtered and is not applicable to drinking. Although water which has been deposited for a long time can become clear, the water has smells and deteriorates in a long time. However, water in wells permeates into the soil or is evaporated fast. In this way, rainwater can not be used well.

In addition, some water for life such as water from washing cars in car washing rooms, or watering flowers or cleaning plazas is often drained through underground watercourses and is not utilized well, thus causing considerable waste of water.

SUMMARY OF THE INVENTION

In order to solve the problems that rainwater or water for life can not be effectively used in the prior art, the invention designs a system capable of cleaning, collecting and storing rainwater, or water for life and the like.

The technical proposal of the system of water collecting, cleaning and storing provided by the invention is as follows:

The system comprises:
1) a top-opened water storing container, with the wall of which a watertight structure;
2) a collecting well provided in the water storing container, which has a lid and has a wall of pervious structure through which water exchange between the water storing container and the collecting well is achieved;

The collecting well is a water storing device capable of exchanging water with the water storing container. The shape of the collecting well can be various, such as hollow cylindrical shape, hollow spherical shape and the like. The shape of the collecting well is matched with the shape of the water storing container. The collecting well is to re-filter the water which is filtered through a pervious surface layer on top of the water storing container and the filling elements in the water storing container; and the re-filtered water is stored in the collecting well for use.

A joint part matched with the caliber of the collecting well is arranged at the bottom of the water storing container. The joint part arranged at the bottom of the water storing container is a lug boss; and the collecting well is sheathed outside the lug boss.

Filling elements are filled between the collecting well and the water storing container, on top of which a pervious surface layer is paved. The pervious surface layer is made of pervious materials.

The wall of the collecting well is made of pervious materials.

The pervious materials of the pervious surface layer and that of the wall of the collecting well are made from the mixture of aggregates and resinoid adhesives; the resinoid adhesives have at least part of hydrophilic resinoid adhesives; the aggregates are one of natural quartz sand, man-made quartz sand, pulverized fuel ash and metallurgical residues or any combination thereof, which is preferably quartz sand, in particular quartz sand in desert. The aggregate size is preferably 0.07 millimeter to 2 millimeters.

Optionally, a filtration medium layer is arranged around the internal side or the external side of the wall of the collecting well.

Optionally, the wall of the collecting well is of a double-layer structure with a hollow space between the two layers, and a filtration medium layer is arranged in the hollow space. The filtration medium layer is made of filter media comprising activated carbon.

Preferentially, the filling elements between the collecting well and the water storing container are quartz sand, preferably quartz sand washed by water; the particle size of the quartz sand is preferentially 0.05 mm to 5 mm.

Optionally, the water storing container is connected with a water collecting pipe; the collecting well is connected with a water supply pipe.

The system of water collecting, cleaning and storing according to the present invention can be used as a system for collecting, cleaning and storing fountain water or water from car washing rooms. When the system is used for collecting, cleaning and storing fountain water or water from car washing rooms, a water pump is arranged in the collecting well; a nozzle is arranged outside the lid; the water pump and the nozzle are connected via a water pipe; and the water storing container recycles the water sprayed from the nozzle.

Because of adopting the technical proposal, the present invention has the following advantages:

1. The rainwater or the sewage collected by the system is filtered through the pervious surface layer of the system of water collecting, cleaning and storing, and filtered and deposited through the filling elements of silver sand, as well as filtered by the collecting well, therefore clean water is obtained; and the clean the clean water is stored in the filling elements or the collecting well, which does not deteriorate or smell easily.

2. The system of water collecting, cleaning and storing according to the invention is built easily, friendly to the environment and saves the energy, which is convenient and practical. Not only the eolian sand in desert is low in cost and friendly to the environment, but also the area of desertized land is reduced as much eolian sand is used, which is favorable for improving the ecological environment.

3. The water storing container of the system of water collecting, cleaning and storing is of a watertight structure, and the collected rainwater can be stored in the container and does not permeate into the ground, which is not lost accordingly.

4. The pervious surface layer of the system of water collecting, cleaning and storing is compact and beautiful.

5. The wall of the collecting well of the system of water collecting, cleaning and storing is of a double-layer structure with a hollow space between the two layers; a filtration medium layer is arranged inside the hollow space, and is used for cleaning water so that the collected water substantially meets the requirements.

6. The system of water collecting, cleaning and storing not only can be used to collect rainwater, but also to collect water for life or industry, such as waste water from car washing rooms, waste water from watering flowers in means of spraying and the like, or to collect rainwater on plazas for cyclic utilization, thus saving water resources.

BRIEF DESCRIPTION OF ACCOMPANYING DRAWINGS

DETAILED DESCRIPTION OF PREFERRED EMBODIMENTS

Figure 1:
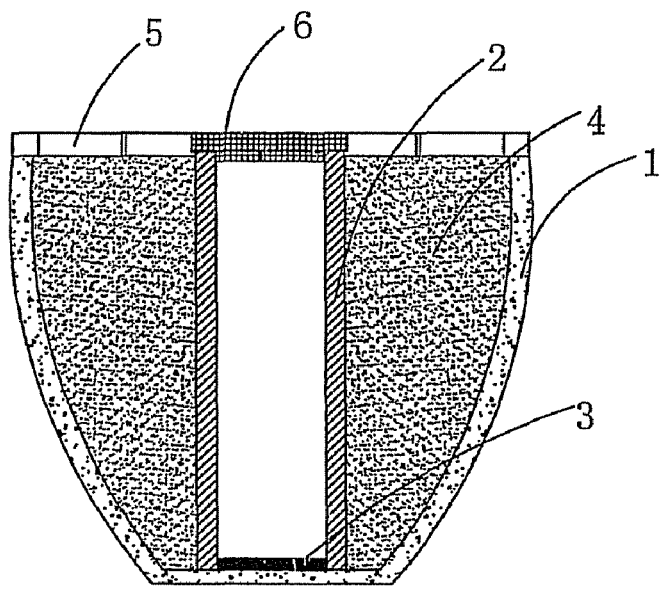
FIG. 1 is the constructed profile of the system of water collecting, cleaning and storing according to the invention.
Figure 2:
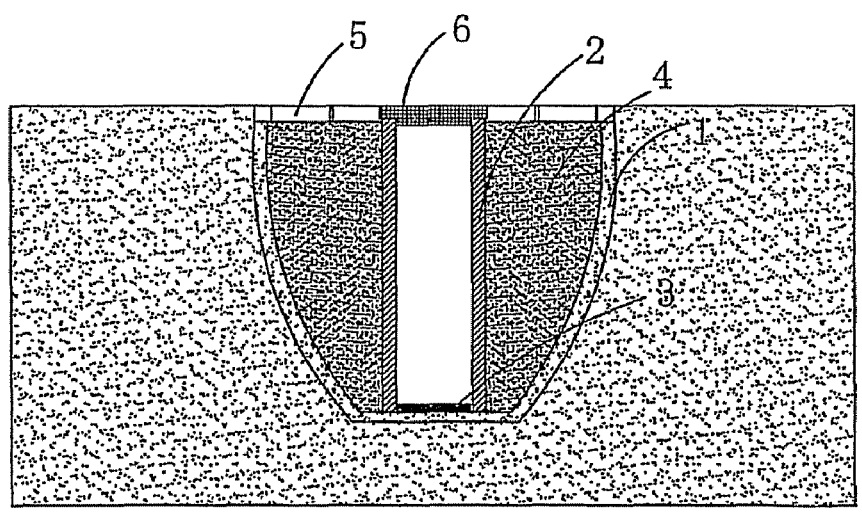
FIG. 2 is the constructed profile of the use state of the system of water collecting, cleaning and storing according to the invention.
Figure 3:
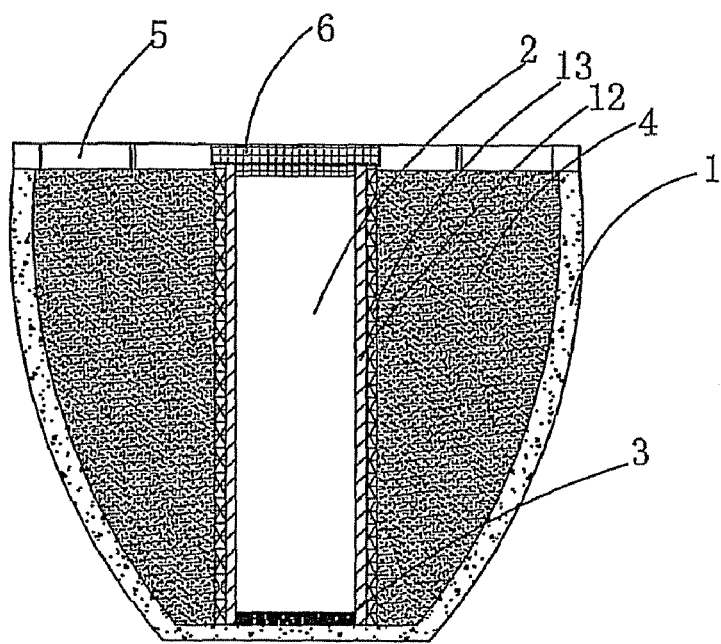
FIG. 3 is the constructed profile of the system of water collecting, cleaning and storing according to embodiments of the invention.
Figure 4:
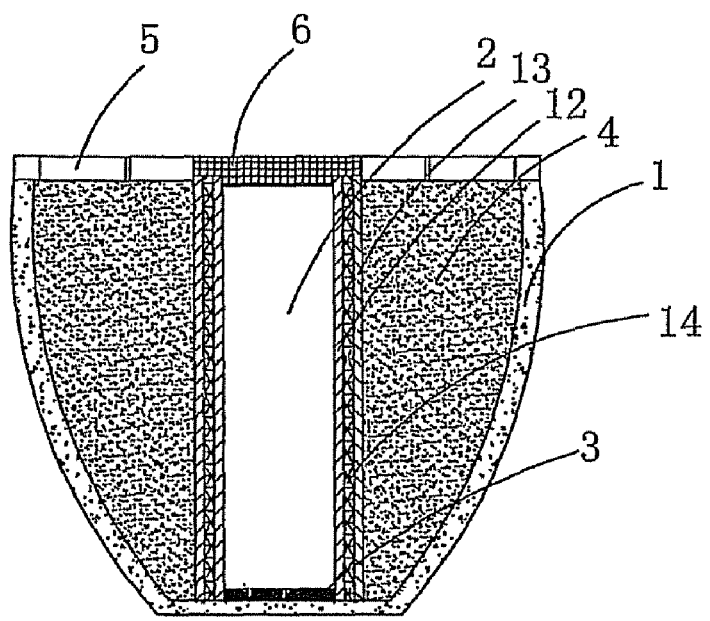
FIG. 4 is the constructed profile of the system of water collecting, cleaning and storing according to embodiments of the invention.
Figure 5:
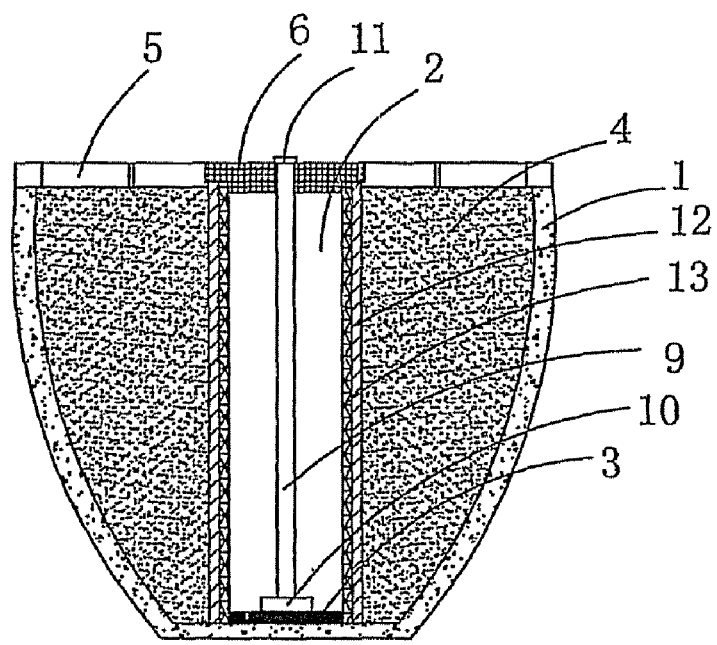
FIG. 5 is the constructed profile of the system of water collecting, cleaning and storing according to the invention used as a system for collecting, cleaning and storing fountain water or a system for collecting, cleaning and storing water from car washing rooms.

In order to describe the concepts and the design proposals of the present invention better, the present invention is further described in combination with the detailed embodiments:

As shown in Drawing 1, the system of water collecting, cleaning and storing comprises:

1) a top-opened water storing container 1, with the wall of which a watertight structure to prevent the collected water from permeating outwards.

2) a collecting well 2 provided inside the water storing container 1, the collecting well 2 is provided with a lid 6 for preventing the water in the collecting well 2 from being polluted and preventing the water in the collecting well 2 from being volatilized; the wall of the well is of pervious structure for exchanging water with the water storing container; the shape of the collecting well can be designed to be various.

Filling elements 4 are filled between the collecting well 2 and the water storing container 1, on top of which a pervious surface layer 5 is paved.

Technicians in the field can understand that the water storing container can be a water storing device of other types and other shapes having the function of storing water, such as a water storing device for recycling the fountain water from fountain systems, or an outer water storing device for the Mother's Water Cellars in dried areas. The collecting well is a water storing device capable of exchanging water with the water storing container. Its shape can be in various forms, such as hollow cylindrical shape, hollow spherical shape and the like. The collecting well is to re-filter the water which is filtered through a pervious surface layer on top of the water storing container and the filling elements in the water storing container; and the water re-filtered is stored in the collecting well for convenient use. For example, the collecting well can be a water storing device for supplying fountain water in the fountain systems, or an inner water storing device for the Mother's Water Cellars in dried areas. The shape of the collecting well and that of the water storing container can be various and are matched with each other.

Rainwater and wastewater from life are collected by the water storing container of the system of water collecting, cleaning and storing; and the collected water passes through the wall of the well in a pervious structure to enter the collecting well, thus rainwater and wastewater for life can be stored and the water resources can be saved.

In order to prevent the filling elements 4 in the water storing container from entering the collecting well 2, a joint part matched with the caliber of the collecting well 2 is arranged at the bottom of the water storing container 1. The joint part arranged at the bottom of the water storing container 1 is a lug boss 3; and the collecting well 2 is sheathed outside the lug boss 3, thus the filling elements in the water storing container is prevented from entering the collecting well.

The embodiment according to the invention is described as follows:

As shown in Drawing 2, a pit covering 20 square meters is dug on the ground with the wall of which a watertight structure made of concrete to form a top-opened water storing container 1; the collecting well 2 arranged inside the water storing container 1 is provided with a lid 6; the wall of the collecting well is made of pervious materials so that water exchange between the collecting well 2 and the water storing container 1 can be achieved. silver sand 4 is filled between the collecting well 2 and the water storing contained, and a pervious surface layer 5 is arranged or paved on the silver sand 4. The pervious surface layer is made of pervious materials, such as pervious bricks.

The pervious materials of the pervious surface layer 5 or that of the wall of the collecting well 2 are made of the mixture of the silver sand and epoxy resin. 10% of the epoxy resin is hydrophilic epoxy resin which is the epoxy resin with the side chains of molecules containing hydrophilic carboxylates.

A lug boss 3 matched with the caliber of the collecting well 2 is arranged at the bottom of the water storing container 1, and the collecting well 2 is sheathed outside the lug boss 3 to prevent silver sand from entering the collecting well 2. In the system of water collecting, cleaning and storing according to the invention, the water storing container collects rainwater or sewage, and then the collected rainwater or sewage is filtered through the pervious surface layer and filtered and deposited through the filling elements of silver sand to get comparative purified water, and subsequently is filtered and purified by the wall of the collecting well, at last the clean water can be obtained and stored in the collecting well. Water is stored in the silver sand or the collecting well, which does not deteriorate or smell easily.

The improved system of water collecting, cleaning and storing according to the embodiments of the invention is described below.

In the system of water collecting, cleaning and storing, the collecting well 2 is a pervious structure made of pervious materials, and the wall of the collecting well is made of a pervious material. As shown in Drawing 3, a filtration medium layer is arranged around the inner side of the wall of the collecting well. The inner layer 12 of the wall of the collecting well is a filtration medium layer. The filtration medium layer is made of filter media comprising activated carbon. The particles of the activated carbon have a plurality of micropores and large specific area, which have strong physical absorbing power and can purify water. The outer layer 13 of the wall of the collecting well is made of pervious materials.

Optionally, a filtration medium layer is arranged around the external side of the wall of the collecting well, i.e., the inner layer 12 of the wall of the collecting well is made of pervious materials, and the outer layer 13 of the wall of the collecting well is a filtration medium layer.

Optionally, as shown in Drawing 4, the wall of the collecting well is of a double-layer structure with a hollow space between the two layers; the double layers are made of pervious materials; a filtration medium layer is arranged in the hollow space. The filtration medium layer is made of filter media comprising activated carbon.

In the system of water collecting, cleaning and storing described above, the pervious surface layer 5 arranged or paved on the filling elements is made of pervious materials; optionally, the pervious surface layer can be made of pervious bricks arranged or paved on the filling elements.

In the system of water collecting, cleaning and storing described below, the pervious materials of the wall of the collecting well, the inner layer or the outer layer of the wall of the collecting well and the pervious surface layer are designed to intercept suspended solid particulates and colloid impurity in water. The pervious materials contain aggregates and an adhesive for bonding the aggregates. In order to effectively intercept the suspended solid particulates and the colloid impurity in water, the aggregates can be natural quartz sand, man-made quartz sand, pulverized fuel ash, metallurgical residues or any combination thereof, which are preferably quartz sand, in particular eolian sand in desert. In order to filter water smoothly, the particle size of the quartz sand is 0.07 mm to 2 mm. The resistance of the grains of the quartz sand is small with high rate of flow so that such reclaimed water as rainwater and the like can smoothly pass through the pervious surface layer to enter into the water storing container and effectively intercept and remove the suspended solid particulate and the colloid impurity in water, thus filtering the water entering the collecting well from the water storing container. The adhesive is composed of at least hydrophilic adhesive and resinoid adhesive. The mass ratio of the adhesive and the aggregates is 1-20 to 100. The hydrophilic adhesive accounts for 1 to 60 percent of the adhesive by mass, and is a hydrophilic resinoid adhesive. The hydrophilic resinoid bond is one of epoxy resin, polyurethane and acrylic resin, or any combination thereof. The side chains of the molecules of the epoxy resin, the polyurethane and the acrylic resin contain carboxylate groups, sulphonate groups, ammonium salt and hydroxyl groups; or the main chains of the molecules of the epoxy resin, the polyurethane and the acrylic resin contain nonionic hydrophilic chain sections. The resinoid adhesive is one of epoxy resin, urethane resin and acrylic resin or any combination thereof. Aliphatic polyamine or aliphatic polyamine curative is added in the epoxy resin, which accounts for 5 to 60 percent of the epoxy resin by mass. The epoxy resin is one of aliphatic epoxy resin, hydrogenated bisphenol-A epoxy resin, organosilicon modified bisphenol-A epoxy resin, saturated ethylene oxide ester epoxy resin, heterocycle or mixed-type epoxy resin or any combination thereof. The urethane resin comprises aliphatic polyhydric alcohol and polyisocyanate; catalyzer for cure reaction of polyurethane is added in the urethane resin, which is lead naphthenate and dibutyl tin laurate. Urethane solvent, chain extender and cross-linking agent can be added in the urethane resin. Weatherable additive is added in the bond, which contains one or both of light stabilizer or antioxidizer. A small quantity of inorganic bond can be added in the adhesive, which can be silicate, phosphate or cement. Coupling agent containing silicone, titanium or phosphorus can be added in the pervious material. Hydrophilic inorganic material can be added in the pervious material, which can be one of kieselguhr, bentonite and perlite or any combination thereof.

The filling elements between the collecting well 2 and the water storing container 1 are silver sand, which is preferentially silver sand washed by water. In order to purify water, preferentially, the filling elements between the collecting well and the water storing container are quartz sand; the particle size of the quartz sand is 0.05 mm to 5 mm. The resistance of the grains of the quartz sand is small with high rate of flow to effectively intercept and remove the suspended solid particulate and the colloid impurity in water, thus filtering the water entering the collecting well from the water storing container. In addition, filling elements are filled between the collecting well 2 and the water storing container 1 to prevent the water in the water storing container from contacting air; an underground water system is simulated; and water can be stored for a long time without deterioration easily.

In the system of water collecting, cleaning and storing, water is filtered through the pervious surface layer of the water storing container; rainwater or water for life-living is collected in the water storing container, and is purified through the filling elements between the collecting well and the water storing container; subsequently, the collected water is purified through the pervious structure of the collecting well to enter into the collecting well.

As shown in Drawing 4, the water storing container of the system of water collecting, cleaning and storing is connected with a water collecting pipe; the collecting well is connected with a water supply pipe. An application of the invention is described below. When the system of water collecting, cleaning and storing is used as a system for collecting, cleaning and storing water on plazas, the system can also be used as a system for collecting rainwater on plazas or rainwater from other buildings and other water for life-living. Firstly, the water storing container is connected with the water collecting pipe of the plaza for collecting the rainwater on the plaza or the wastewater from washing the plaza. The water enters into the water storing container through the pervious surface layer of the water storing container. Subsequently, the water collected in the water storing container is purified through the pervious structure of the collecting well to enter into the collecting well. The collecting well is connected with the water supply pipe, accordingly, the water in the collecting well can be used for watering flowers, cleaning plazas or other purposes. The water which has been used for watering flowers by means of spraying or cleaning plazas or rainwater on the plazas is drained into the water storing container through the water collecting pipes on the plazas, thus water recycling is completed.

As shown in Drawing 5, when the system of water collecting, cleaning and storing is used as a system for collecting, cleaning and storing fountain water or a system for collecting, cleaning and storing water from car washing rooms, a water pump 10 is arranged in the collecting well; a nozzle 11 is arranged outside the lid; the water pump 10 is connected with the nozzle 11 through a water pipe 9; the water storing container reclaims the water sprayed from the nozzle 11. The water pump arranged in the collecting well forms a fountain device with the nozzle arranged outside the lid through the water pipe. Rainwater or water for life-living is collected to form fountains; and the collected water can be recycled, thus saving water resources.

The system of water collecting, cleaning and storing can be used for collecting and storing rainwater in dried areas, and for disposing of sewage as well as for improving the Mother Reservoirs in dried areas.

The descriptions above are just detailed descriptions of the invention, which do not cover the protection scope of the invention. Any technician familiar with the technical field can understand easily that in the technical scope disclosed by the invention any change or substitution shall be covered in the protection scope of the invention. Accordingly, the protection scope of the invention is subject to the protection scope of the claim.

What is claimed:

1. A system of water collecting, cleaning and storing, the system comprises:
   a top-opened water storing container having a wall, with the wall of the water container having a watertight structure;
   a collecting well provided in the water storing container, which has a lid and has a wall of pervious structure through which water exchange between the water storing container and the collecting well is achieved, wherein a filtration medium layer is arranged around the internal side or the external side of the wall of the collecting well or wherein the wall of the collecting well is a double-layer structure with a hollow space between the two layers of the double-layer structure, and a filtration medium layer is arranged in the hollow space;
   filling elements filled between the collecting well and the water storing container, wherein a pervious surface layer is paved on the top of the filling elements and the pervious surface layer is located around the lid of the collecting well.

2. The system of claim 1, wherein a joint part matched with the caliber of the collecting well is arranged at the bottom of the water storing container.

3. The system of claim 2, wherein the joint part arranged at the bottom of the water storing container is a lug boss, and the collecting well is sheathed outside the lug boss.

4. The system of claim 1, wherein the wall of the collecting well and/or the pervious surface layer on top of the filling elements is made of pervious materials.

5. The system of claim 4, wherein the pervious material comprises aggregates and adhesives for bonding the aggregates; the adhesives comprise at least hydrophilic adhesives.

6. The system of claim 5, wherein the aggregate size is 0.07 mm to 2 mm.

7. The system of claim 5, wherein the aggregates are quartz sand.

8. The system of claim 5, wherein the mass ratio of the adhesives and the aggregates is 1 to 20:100.

9. The system of claim 5, wherein the hydrophilic adhesives is hydrophilic resinoid adhesives.

10. The system of claim 9, wherein the hydrophilic resinoid adhesives are one of epoxy resin, polyurethane and acrylic resin, or any combination thereof; the side chains of the molecules of the epoxy resin, the polyurethane and the acrylic resin contain carboxylate groups, sulphonate groups, ammonium salt and hydroxyl groups; or the main chains of the molecules of the epoxy resin, the polyurethane and the acrylic resin contain nonionic hydrophilic chain sections.

11. The system of claim 5, wherein weather resistant additive is added in the adhesives, the weather resistant additive comprises one or both of light stabilizer or antioxidizer.

12. The system of claim 5, wherein a small quantity of inorganic adhesives is added in the adhesives.

13. The system of claim 1, wherein the filtration medium layer is made of filter media containing activated carbon.

14. The system of claim 1, wherein the filling elements between the collecting well and the water storing container are quartz sand, the particle size of the quartz sand is 0.05 mm to 5 mm.

15. The system of claim 1, wherein the system of water collecting, cleaning and storing is used as a system for collecting, cleaning and storing fountain water or a system for collecting, cleaning and storing water from car washing rooms.

16. The system of claim 1, wherein a water pump is arranged in the collecting well; a nozzle is arranged outside the lid; the water pump is connected with the nozzle via a water pipe; the water storing container collects the water sprayed from the nozzle.

* * * * *